(12) United States Patent
Crandall et al.

(10) Patent No.: US 6,284,293 B1
(45) Date of Patent: Sep. 4, 2001

(54) METHOD FOR GENERATING OXYGENATED WATER

(76) Inventors: Jeffery J. Crandall, 1764 E. Wilbur Ave., Dalton Gardens, ID (US) 83815; Brian W Mantz, 11720 N. Lancelot Dr., Spokane, WA (US) 99218; Edward C Martz, 13665 N. Church Rd., Rathdrum, ID (US) 83858

( * ) Notice: Subject to any disclaimer, the term of this patent is extended or adjusted under 35 U.S.C. 154(b) by 0 days.

(21) Appl. No.: 09/548,059

(22) Filed: Apr. 12, 2000

(51) Int. Cl.[7] ............................... A23L 2/00; B65D 85/00
(52) U.S. Cl. .................... 426/67; 426/423; 426/475; 210/652; 210/666; 210/749; 210/751; 210/752; 210/753; 210/755; 210/756; 261/781; 261/76; 261/83
(58) Field of Search .......................... 426/67, 475, 423; 210/652, 749, 666; 205/751, 753, 752, 755, 756; 261/78.1, 76, 83

(56) References Cited

U.S. PATENT DOCUMENTS

| | | | |
|---|---|---|---|
| 3,691,041 | 9/1972 | Straizer | 204/152 |
| 3,925,176 | 12/1975 | Okert | 204/152 |
| 3,975,247 | 8/1976 | Stralser | 204/152 |
| 4,289,599 | 9/1981 | Fushihara | 204/275 |
| 4,917,782 | 4/1990 | Davies | 204/152 |
| 5,062,940 | 11/1991 | Davies . | |
| 5,236,722 * | 8/1993 | Schroeder | 426/67 |
| 5,324,398 | 6/1994 | Erickson et al. | 204/149 |
| 5,328,584 | 7/1994 | Erickson et al. | 204/229 |
| 5,389,214 | 2/1995 | Erickson et al. | 204/149 |
| 5,587,191 * | 12/1996 | Donsbach et al. | 426/66 |
| 5,603,843 * | 2/1997 | Snee | 210/748 |
| 5,711,950 | 1/1998 | Lorenzen | 424/401 |
| 5,728,287 | 3/1998 | Hough | 205/743 |
| 5,814,222 | 9/1998 | Zelenak | 210/615 |
| 5,885,467 * | 5/1999 | Zelenak et al. | 210/758 |
| 5,897,765 * | 4/1999 | Mercier | 205/743 |
| 5,904,851 * | 5/1999 | Taylor et al. | 210/620 |
| 6,171,469 * | 1/2001 | Hough et al. | 205/743 |
| 6,197,189 * | 3/2001 | Schwartz et al. | 210/192 |
| 6,200,476 * | 3/2001 | Donath et al. | 210/629 |

* cited by examiner

*Primary Examiner*—Nina Bhat
(74) *Attorney, Agent, or Firm*—David S. Thompson

(57) ABSTRACT

An apparatus 10 generates oxygenated water having a significantly reduced oxidation reduction potential (ORP). A carbon filter 100 removes particulate impurities from the water as it comes into the apparatus. A water softener 150 removes minerals from the water. A reverse osmosis unit 200 further cleans and purifies the water, removing any additional solids, and almost all the minerals and chlorides. A blender 250 adds a precisely measured amount of sodium bicarbonate or sodium carbonate to the water, thereby making it somewhat electrically conductive. The purified water having a measured quantity of sodium bicarbonate is stored in a tank 300 which also includes a recirculating pump 350 which keeps the water moving. By keeping the water moving, the minimum level of sodium bicarbonate required for electrical conductivity may be used. A pump 400 moves the water into an electrolysis cell 450, where current passing through the water separates a small amount of water into hydrogen and oxygen. The water is then transferred to a sparging unit 500, where it flows in a spiraling manner in an oxygen-rich environment, thereby further increasing the oxygen level to approximately 50 to 60 ppm.

8 Claims, 8 Drawing Sheets

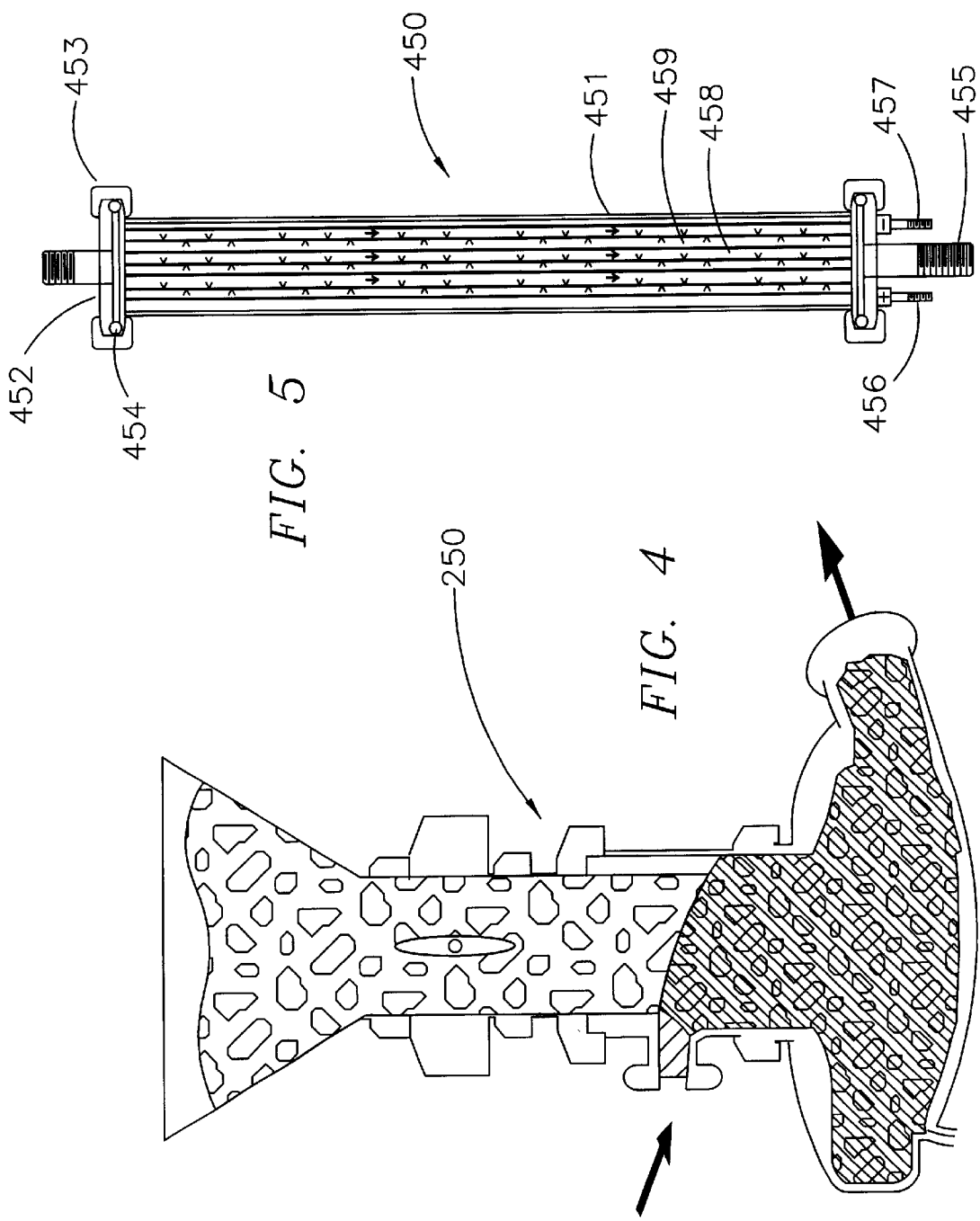

METHOD FOR GENERATING OXYGENATED WATER

CROSS-REFERENCES

There are no applications related to this application filed in this or any foreign country.

BACKGROUND

A number of devices have been developed for processing drinking water. These include filtration devices and oxygenating devices. The need for filtration devices to remove impurities is obvious. In particular, as pollution and overpopulation puts greater strains on the available supplies of drinking water, there is a general tendency for municipal water supplies to degrade, and consequently, for bottled water and filtered water to become more popular.

Additionally, it has more recently become known that increasing the oxygen content in water has health benefits. As a result, a method and apparatus for generating oxygenated water is known. For example, U.S. Pat. No. 5,728,287, issued to Hough et al. in 1998, discloses a method of oxygenating water with electrolytic cells. The disclosure includes means for supplying a varying amount of water with at least a selected level of oxygen. In spite of this advance, technology is limited in its ability to raise the levels of oxygen concentration within water. Because the demand for higher levels of oxygen concentration in water exceeds the ability of current technology, there remains a need for a new and novel method and apparatus for generating oxygenated water.

Similarly, the popular medical press has indicated that antioxidants may be instrumental in preventing disease and in protecting cells from damage that can result in premature aging. As a result, it is widely known that certain vitamins have an antioxidant potential. However, because the availability of antioxidants is limited to certain foods and food supplements, it is not the case that all people consume an adequate supply of antioxidants. Therefore, additional availability of antioxidants would result in an increase in the health of many people.

SUMMARY

The present invention is directed to an apparatus that satisfies the above needs. A novel method and apparatus for generating oxygenated water is disclosed that provides greater water purity and higher levels of oxygen than is possible using previous technology.

The method and apparatus for generating oxygenated water of the present invention provides some or all of the following structures and procedural steps.

(A) The water is purified by use of a carbon filter.

(B) The water is softened, i.e. mineral content removed, by a generally conventional water softening process, in that salt is used to form brine which is used in a process that removes minerals from the water.

(C) The water is processed by a reverse osmosis unit, which further reduces the particulate level, mineral level and chloride level.

(D) A blender adds sodium bicarbonate (or alternatively sodium carbonate) to the water at a rate of approximately ⅛ cup sodium bicarbonate per 100 gallons of water.

(E) In one application of the method and apparatus of the invention, the water is transferred to a storage tank. This is particularly useful where the reverse osmosis unit is operated over a period of time, such as overnight, to obtain a sufficient quantity of water.

(F) Where a storage tank is used, a recirculating pump keeps the water in the storage tank moving, and thereby keeps the sodium bicarbonate in solution. Keeping the water moving allows the use of the minimal amount of sodium bicarbonate required to result in sufficient electrical conductivity of the water.

(G) The water is then passed through an electrolytic cell, where a small amount of water is separated into its constituent parts of hydrogen and oxygen. At this point in the procedure, the dissolved oxygen level will typically be approximately 20 to 25 parts per million (ppm). The oxidation reduction potential (ORP) level is substantially lowered, resulting in a level of +50 to −350 mV, thereby making the water functional as an antioxidant.

(H) The water then enters a sparging unit. In the sparging unit, the water moves downwardly on a spiraling concourse in a manner which results in a large surface area of contact with oxygen gas. Enough oxygen enters into solution during the sparging process to raise the level of oxygen to 50 to 60 parts per million.

(I) The water is then bottled for later consumption as drinking water.

It is therefore a primary advantage of the present invention to provide a novel method and apparatus for generating oxygenated water which achieves a synergistic combination of higher levels of oxygen concentration and greater antioxidant potential than is possible with known technology.

Another advantage of the present invention is to provide a novel method and apparatus for generating oxygenated water having a substantial antioxidant potential which uses a combination of carbon filters, water softeners, reverse osmosis, electrolysis and sparging to result in water having a high oxygen concentration and an antioxidant potential.

A still further advantage of the present invention is to provide a sparging unit with a novel spiral structure which results in greater oxygen absorption by water contained within the sparging unit.

Other objectives, advantages and novel features of the invention will become apparent to those skilled in the art upon examination of the specification and the accompanying drawings.

DRAWINGS

These and other features, aspects, and advantages of the present invention will become better understood with regard to the following description, appended claims, and accompanying drawings where:

Figure 2:
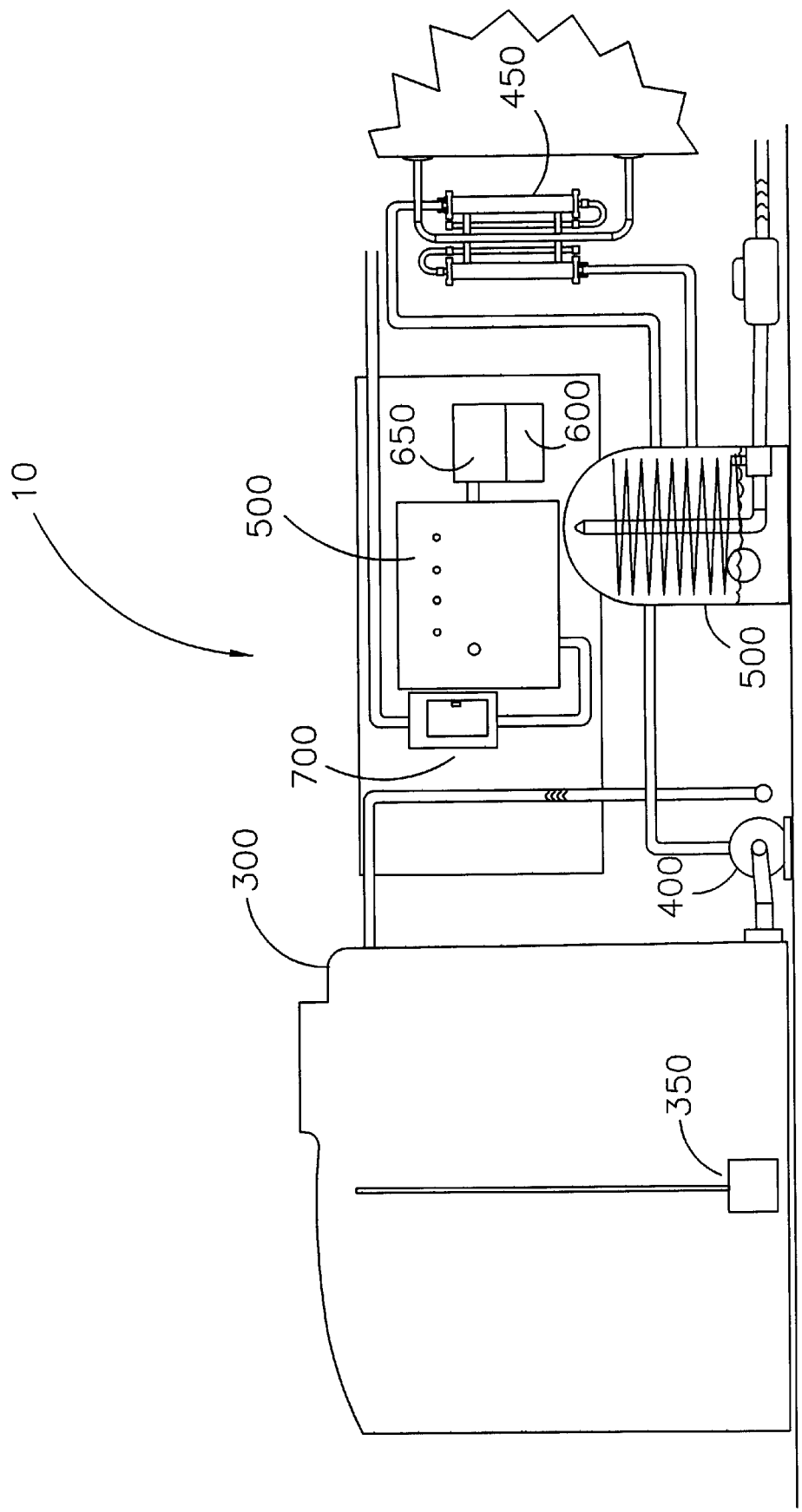

FIG. 2 a diagrammatic view of the control panel, electrolysis cells and the sparging unit.

Figure 3:
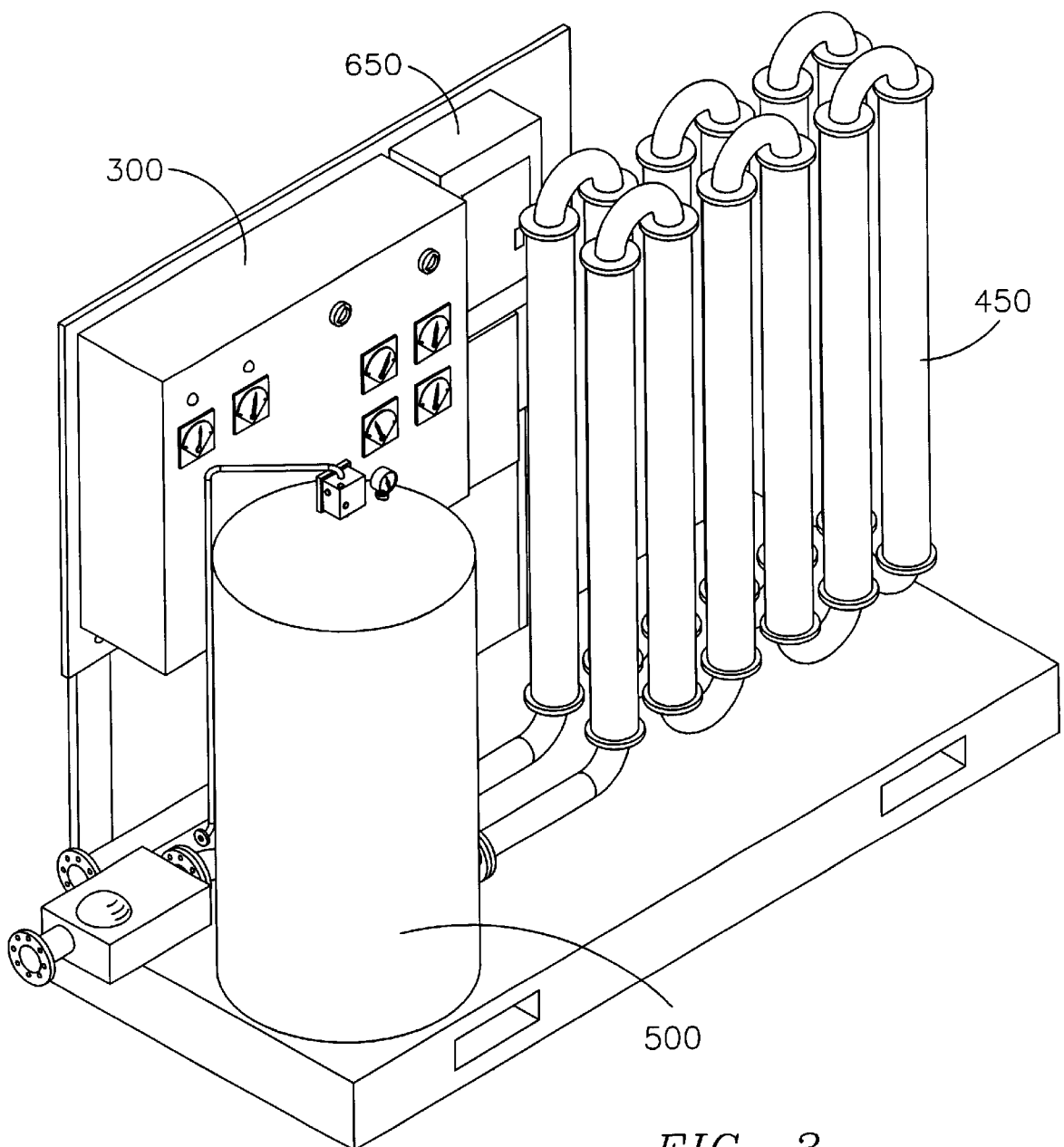

FIG. 3 a perspective view of the control panel, electrolysis cells and the sparging unit.

FIG. 4 is a cut-away view of the blender unit which adds sodium bicarbonate.

FIG. 5 is a cross-sectional view of an electrolysis cell.

Figure 6:
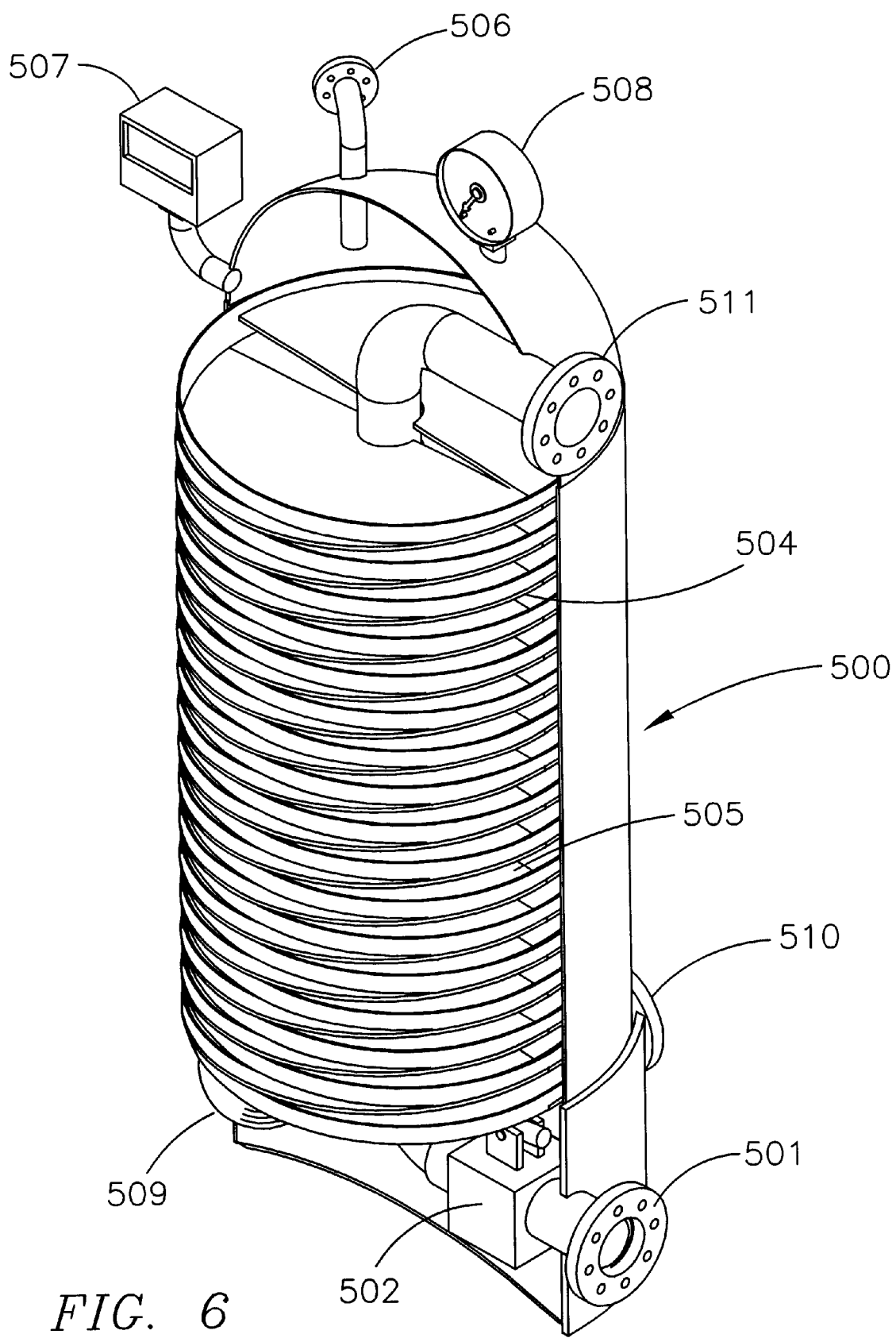

FIG. 6 is a cut-away perspective view of the sparging unit, showing the spiraling concourse within the unit.

Figure 6A:
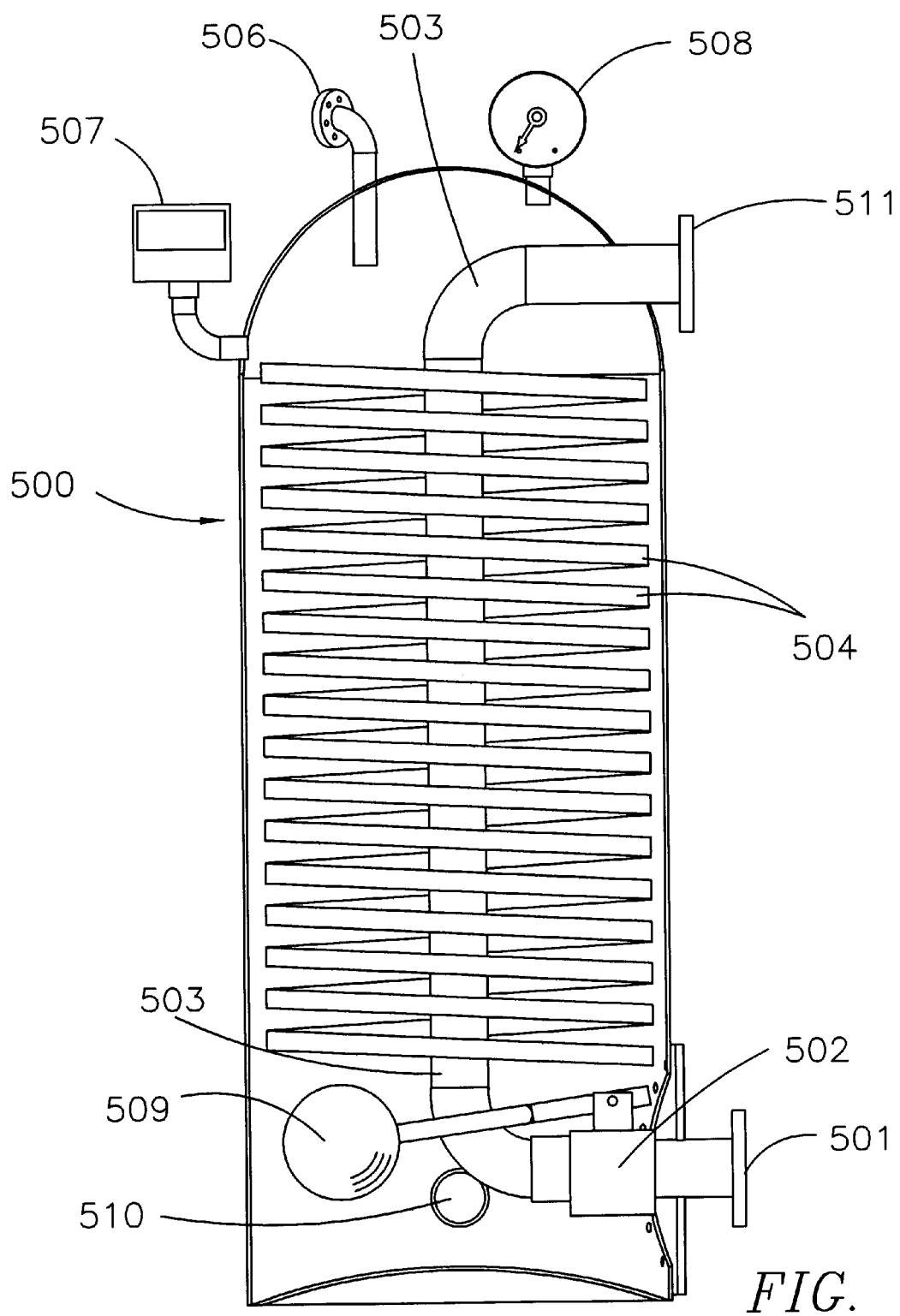

FIG. 6A is a orthographic view of the sparging unit of FIG. 6.

DESCRIPTION

Referring in generally to FIGS. 1 through 6, an apparatus 10 for generating oxygenated water having a significantly reduced oxidation reduction potential (ORP) constructed in accordance with the principles of the invention is seen. A carbon filter 100 removes particulate impurities from the water as it comes into the apparatus. A water softener 150 removes minerals from the water. A reverse osmosis unit 200 further cleans and purifies the water, removing any additional solids, and almost all the minerals and chlorides. A blender 250 adds a precisely measured amount of sodium bicarbonate or sodium carbonate to the water, thereby making it somewhat electrically conductive. In one embodiment of the invention, the purified water having a measured quantity of sodium bicarbonate is stored in a tank 300. Within the storage tank, a recirculating pump 350 keeps the water moving. By keeping the water moving, the minimum level of sodium bicarbonate required for electrical conductivity may be used. A pump 400 moves the water into an electrolysis cell 450, where current passing through the water separates a small amount of water into hydrogen and oxygen. The hydrogen and oxygen tend to both raise the oxygen level in the water to approximately 20 to 25 parts per million (ppm), and also to result in the water becoming an antioxidant, having an ORP of +50 to −350 mV. The water is then transferred to a sparging unit 500, where it flows in a spiraling manner in an oxygen-rich environment, thereby further increasing the oxygen level to approximately 50 to 60 ppm.

Figure 1:
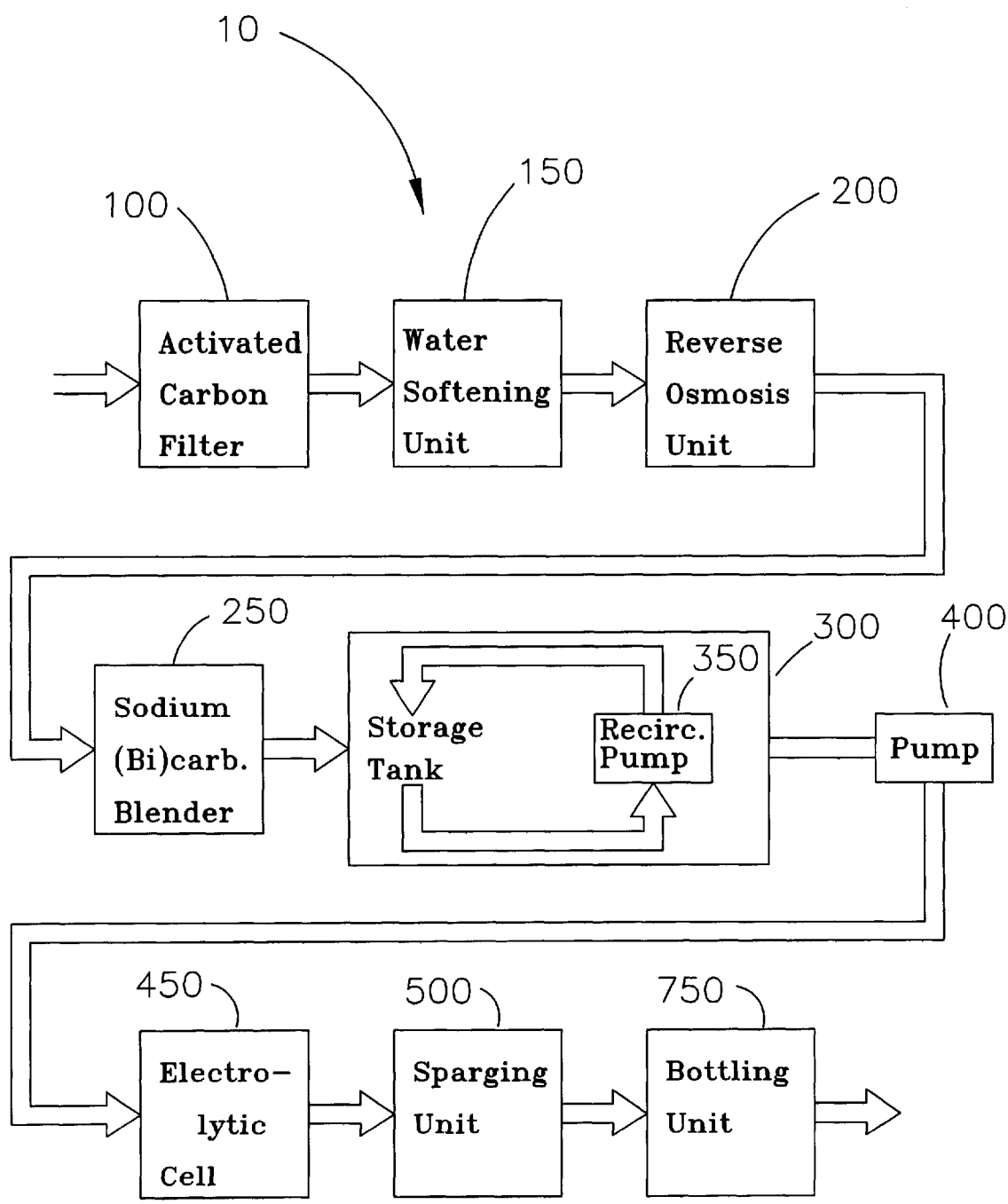
FIG. 1 is a schematic view of the apparatus for generating oxygenated water, showing the flow of water through a carbon filter, a water softening unit, a reverse osmosis unit, a blender which adds sodium bicarbonate, a storage tank having a recirculating pump, an electrolytic cell and a sparging unit.
Figure 1A:
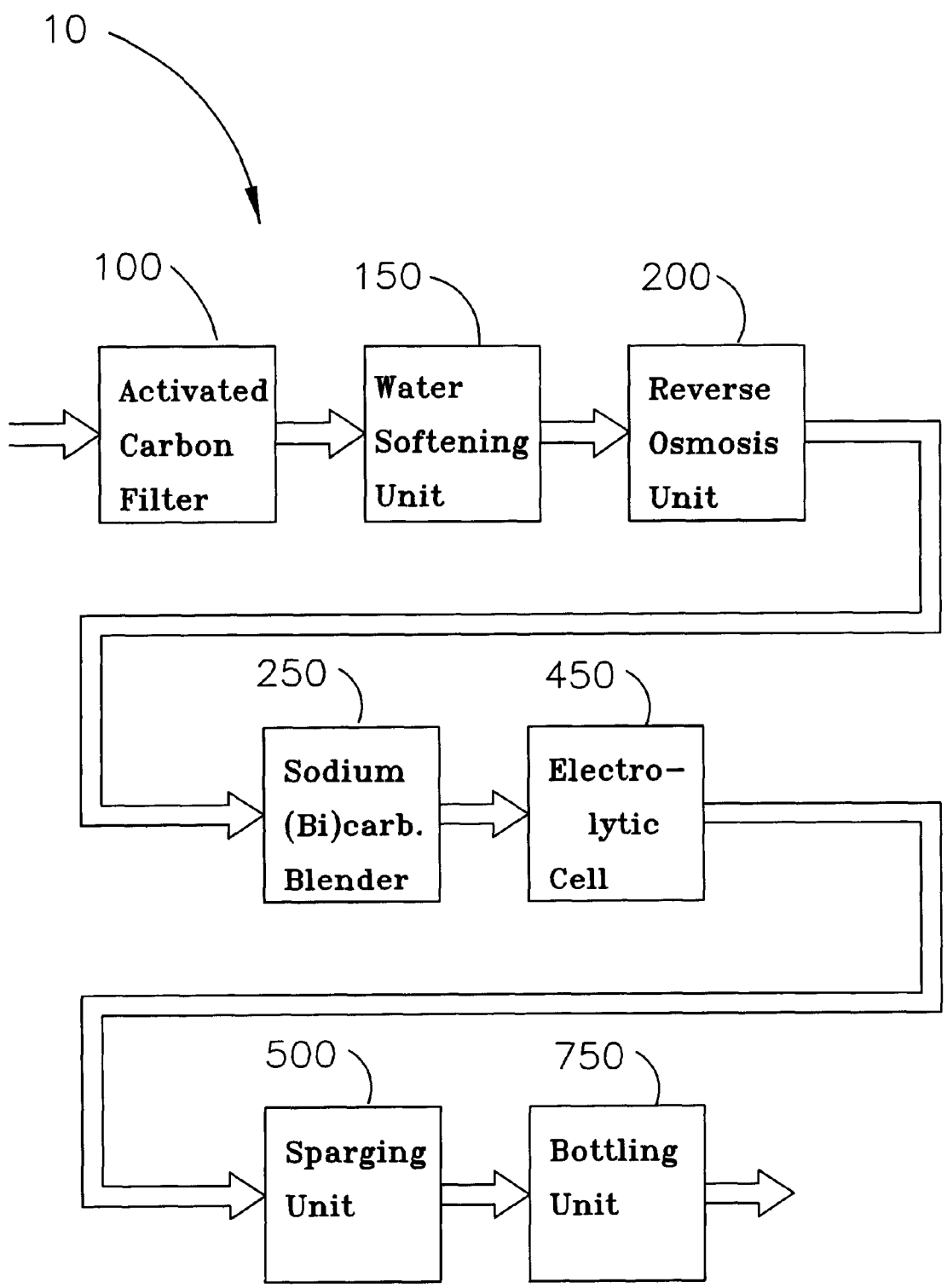
FIG. 1A is a schematic view similar to FIG. 1, but having an "in-line" configuration, without the need for a storage tank.

As seen in the versions of the invention of FIGS. 1 and 1A, water entering the system is purified by use of a carbon filter 100. The carbon filter removes particles carried by the water, thereby purifying the water, making it more consistent and improving its taste.

Figure 1B:
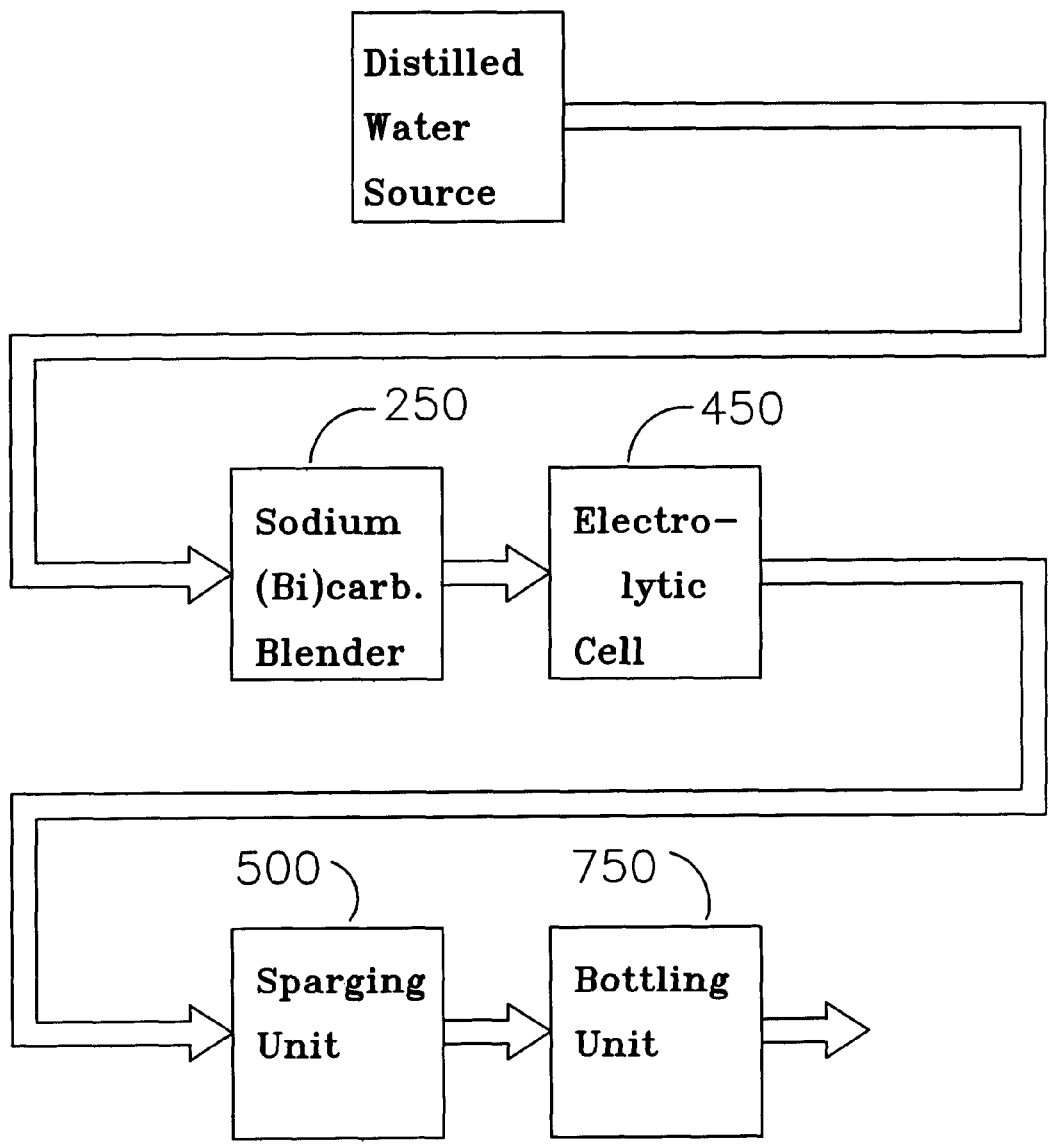
FIG. 1B is a schematic view similar to FIG. 1, but having the carbon filter, a water softening unit and a reverse osmosis unit replaced by the use of distilled water.

As seen in the version of the invention of FIG. 1B, where distilled water is input into the system, there is typically no need to use carbon filtration.

As seen in the versions of the invention of FIGS. 1 and 2, water leaving the carbon filter 100 passes through a water softener 150. The water softener removes most of the mineral content removed. In a preferred version, the water softening process is conventional, in that salt is used to form brine which is used in a process that tends to elevate the salt content in the water, but removes mineral content.

As seen in FIGS. 1 and 1A, water leaving the water softening unit 150 is transferred to a reverse osmosis unit 200. The reverse osmosis unit cleans and purifies the water by removing almost all of the remaining minerals and salts present in the water.

Reverse osmosis devices suitable for use with the versions of the invention of FIGS. 1 and 1A are commercially available by a variety of different manufacturers.

A blender 250 adds sodium bicarbonate (or alternatively sodium carbonate) to the water leaving the reverse osmosis unit 200. A blender suitable for adding a very precise amount of granular solid to a measured flow rate of fluid is known and commercially available. Examples of such blenders include those used in commercial applications for the mixing of powdered milk and water.

In a preferred embodiment of the invention, the sodium bicarbonate is added to the water leaving the reverse osmosis unit at a rate of ⅛ cup sodium bicarbonate per 100 gallons of water.

If desired, sodium carbonate or other soluble material could be substituted, provided that the resulting solution has the appropriate electrical conductivity.

In the version of the method and apparatus of the invention seen in FIG. 1, the water leaving the blender 250 is transferred to a storage tank 300. Use of a storage tank is particularly useful where the output (in gallons per minute) of the reverse osmosis unit 200 is significantly less than the output of the sparging unit 500 and the bottling unit 750. In such a circumstance, the reverse osmosis unit is operated over a period of time, such as overnight. Such an extended period of time allows the storage tank to fill.

Where a storage tank 300 is used, a recirculating pump 350 keeps the water in the storage tank moving. The motion of the water prevents the sodium bicarbonate from dropping out of solution. Keeping the sodium bicarbonate from dropping out of solution allows the use of the minimal amount of sodium bicarbonate required to result in sufficient electrical conductivity of the water.

A pump 400 drives water from the storage tank and through the electrolytic cells 450 and sparging unit 500. The pump is driven by the control circuitry contained within the control panel 550, and is driven at a speed appropriate to result in the water spending adequate time within the electrolytic cells.

As seen in FIGS. 1, 1A and 1B, water is then passed through an electrolytic cell 450, where a small amount of water is separated into its constituent parts of hydrogen and oxygen. At this point in the procedure, the dissolved oxygen level will typically be approximately 20 to 25 parts per million (ppm). The electrolytic cell also lowers the measurement of the oxidation reduction potential (ORP) level of the water. In a typically application, the input water has a ORP measurement of +400 mV. After passage through the electrolytic cell, the resulting ORP measurement is typically within the range of +50 to 350 mV. As a result of the lowering of the ORP value, the water becomes functional as an antioxidant when consumed by a person, and has health benefits similar to that seen in various foods and vitamins.

As seen in FIG. 5, a preferred embodiment of the invention includes 30 electrolytic cells 450. Each electrolytic cell includes a stainless steel enclosure 451, which is a tube having two open ends. An end plate 452, compression clamp 453 and elastomer gasket 454 secure each end of the enclosure tube. A threaded pipe 455, extending from each end plate, allows water input and output connections to be attached.

One end of the electrolytic cell 450 includes a positive terminal 456 and a negative terminal 457. In a preferred embodiment, the terminals are made of titanium, and are threaded to allow the power supply cables to be attached using nuts or other electrical attachment device. The terminals are insulated by a non-conducting material, and pass through the end plate.

Within the enclosure 451, a plurality of titanium plates 458 are oriented in the lengthwise direction of the enclosure. Adjacent plates are separated by spaces 459, thereby allowing water to flow between them. Adjacent plates are in electrical communication with electrical terminals of opposite electrical voltage potential, thereby causing current to flow through water.

In a preferred embodiment, the electrical potential across the positive and negative terminals of the electrolysis cells is 30 volts DC, but could be varied somewhat if desired. An ample supply of oxygen to dissolve into the water is present when the current is at 80 A per electrolytic cell.

A power supply 600 and transformers 650 input AC current and output 30 volts of DC current. Where conditions require, in an attempt to limit current through the thirty electrolytic cells of the preferred embodiment to less than 80 amps. per cell and a total of 2500 amps. through all of the cells, the power supply automatically lowers the output voltage below the standard 30 volts.

The power supply is programmed to reverse polarity at timed intervals. Such reversals prevent the build up on the electrodes or loss of electrode material. Where an electrolytic cell is turned off in the middle of a cycle, the cycle is resumed in progress when the electrolytic cell is turned back on.

To prevent overloading the power supply, a panel of circuit breakers 700 prevents excessive current from passing through each of the 30 electrolytic cells, by limiting the current through each to no more than 100 amps. Overall current is limited to 2500 amps.

The water leaving the electrolytic cells 450 enters a sparging unit 500. In the sparging unit, the water moves downwardly on a spiraling concourse in a manner which results in contact with oxygen gas. Enough oxygen enters into solution during the sparging process to raise the level of oxygen to 50 to 60 parts per million.

Referring in particular to FIGS. 6 and 6A, a preferred version of the sparging tank 500 is seen. Water enters at the inlet pipe 501 then travels through float valve 502. The water then travels up through the main delivery pipe 503. The water then passes onto an upper portion of the spiraling discs 504 through a small hole positioned above each level of the spiraling discs defined in the main delivery pipe 503. An outer peripheral edge of the discs 504 provides a vertical lip 505 around the circumference which prevents water from moving beyond the peripheral edge. The spiraling discs keeps the water in a rotating motion spiraling downward while being exposed to oxygen, which is injected into the sparging tank through the fitting 506.

The pressure in the sparging tank is controlled by a pressure relief valve 507. The pressure in the sparging tank can be visually monitored by viewing a pressure gauge 508. The pressure relief valve 507 can be controlled by a programmable logic controller (PLC), carried within the control panel 550. Alternatively, a manual adjustment on the mechanically adjustable relief valve 507 may be substituted.

As the water spirals downward along the spiraling discs 504, the water begins to fill the base of the sparging tank and accumulates at a level which is controlled by a float 509 and float valve 502. When the float 509 is raised to its maximum adjustment, it causes the float valve 502 to close, stopping the water from entering the sparging tank at inlet pipe 501.

The pressure in the sparging tank is controlled by the pressure relief valve 507, and by the addition of pressurized oxygen at fitting 506. The pressure within the sparging tank causes water to discharge from the outlet pipe 510. An overflow fitting 511 allows the water in the delivery pipe 503 to be diverted and redirected in the event that the pressure becomes too high.

The flow rate within the delivery pipe is controlled by means of a flow restricter valve mounted after the fitting 511. This allows regulation of the volume of water passing through the holes in the main delivery pipe 503.

The combination of the spiraling discs, the holes defined in the delivery tube at each disc level and the rolling wave pattern assumed by the water as it moves downwardly tends to result in a large surface area exposed to the oxygen, and a high rate of oxygen transfer. Enough oxygen enters into solution during the sparging process to raise the level of oxygen to 50 to 60 parts per million.

The control panel provides electrical controls, including on-off switches for the various components included in the system 10. Also includes are dissolved oxygen level gauges and ORP gauges, which let the operator control the operation of the system.

The water leaving the sparging unit 500 is then bottled by the bottling unit 750 for later consumption as drinking water.

As seen in the version of the invention of FIG. 1A, an "in-line" system does not use a storage tank 300. Instead, the output of the reverse osmosis unit 200 is fed directly into the blender 250, where the water is mixed with sodium bicarbonate.

As seen in the version of the invention of FIG. 1B, the carbon filter 100, water softening unit 150 and reverse osmosis unit 200 have been replaced by the use of distilled water. Since distilled water does not require purification, these devices may be omitted.

The previously described versions of the present invention have many advantages, including a primary advantage of providing a novel method and apparatus for generating oxygenated water which achieves a synergistic combination of higher levels of oxygen concentration and greater antioxidant potential than is possible with known technology.

Another advantage of the present invention is to provide a novel method and apparatus for generating oxygenated water having a substantial antioxidant potential which uses a combination of carbon filters, water softeners, reverse osmosis, electrolysis and sparging to result in water having a high oxygen concentration and an antioxidant potential.

A still further advantage of the present invention is to provide a sparging unit with a novel spiral structure which results in greater oxygen absorption by water contained within the sparging unit.

Other objectives, advantages and novel features of the invention will become apparent to those skilled in the art upon examination of the specification and the accompanying drawings.

Although the present invention has been described in considerable detail and with reference to certain preferred versions, other versions are possible. For example, while in a preferred embodiment of the invention, sodium bicarbonate or sodium carbonate are used, it is clear that some substitution could be made, while still in keeping within the teachings of the invention. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for increasing the level of dissolved oxygen and lowering the oxidation reduction potential (ORP) level, comprising the steps of:
   (A) passing the water through an electrolytic cell, where a small amount of water is separated into its constituent parts of hydrogen and oxygen, whereby the dissolved oxygen level is raised and the ORP level is lowered, thereby making the water functional as an antioxidant; and
   (B) passing the water through a sparging unit, whereby the dissolved oxygen level is again raised.

2. The method for generating oxygenated water of claim 1, wherein prior to passing the water through an electrolytic cell, the method additionally comprises the step of purifying the water with a carbon filter.

3. The method for generating oxygenated water of claim 2, wherein after passing the water through the carbon filter, the method additionally comprises the step of softening the water with a water softener.

4. The method for generating oxygenated water of claim 3, wherein after softening the water, the method additionally comprises the step of processing the water with a reverse osmosis unit.

5. The method for generating oxygenated water of claim 4, wherein after processing the water with a reverse osmosis unit, the method additionally comprises the step of blending sodium bicarbonate into the water.

6. The method for generating oxygenated water of claim 4, wherein after processing the water with a reverse osmosis unit, the method additionally comprises the step of blending sodium carbonate into the water.

7. A method for increasing the level of dissolved oxygen and lowering the oxidation reduction potential (ORP) level, comprising the steps of:
   (A) purifying the water with a carbon filter;
   (B) softening the water with a water softener;
   (C) processing the water with a reverse osmosis unit;
   (D) blending sodium bicarbonate into the water;
   (E) storing the water in a storage tank;
   (F) moving the water in the storage tank with a recirculating pump;
   (G) passing the water through an electrolytic cell, where a small amount of water is separated into its constituent parts of hydrogen and oxygen, whereby the dissolved oxygen level is raised and the oxidation reduction potential (ORP) level is lowered, thereby making the water functional as an antioxidant; and
   (H) passing the water through a sparging unit, whereby the dissolved oxygen level is again raised.

8. Water having an elevated level of dissolved oxygen and a lowered ORP level due to passage through an electrolytic cell and having a level of dissolved oxygen additionally elevated due to passage through a sparging unit, comprising:
   (A) dissolved oxygen within the range of 20 to 60 parts per million; and
   (B) an ORP level of +100 to −350 mV.

* * * * *